(No Model.)

J. H. SHAW.
MEAT CUTTER.

No. 478,823. Patented July 12, 1892.

Witnesses.
J. H. Shumway
Lillian D. Kelsey

John H. Shaw, Inventor
By atty.
Earle H. Seymour

UNITED STATES PATENT OFFICE.

JOHN H. SHAW, OF NEW HAVEN, CONNECTICUT, ASSIGNOR TO THE SARGENT & COMPANY, OF SAME PLACE.

MEAT-CUTTER.

SPECIFICATION forming part of Letters Patent No. 478,823, dated July 12, 1892.

Application filed October 19, 1891. Serial No. 409,168. (No model.)

*To all whom it may concern:*

Be it known that I, JOHN H. SHAW, of New Haven, in the county of New Haven and State of Connecticut, have invented a new Improvement in Meat-Cutters; and I do hereby declare the following, when taken in connection with accompanying drawings and the letters of reference marked thereon, to be a full, clear, and exact description of the same, and which said drawings constitute part of this specification, and represent, in—

Figure 1:
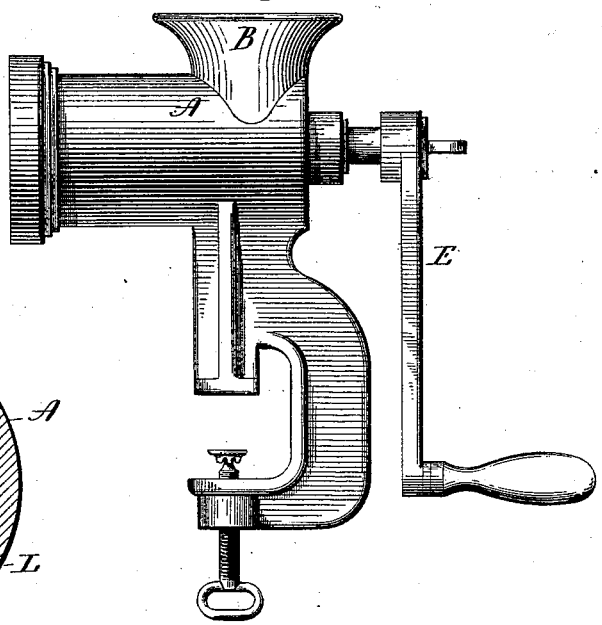
Figure 3:
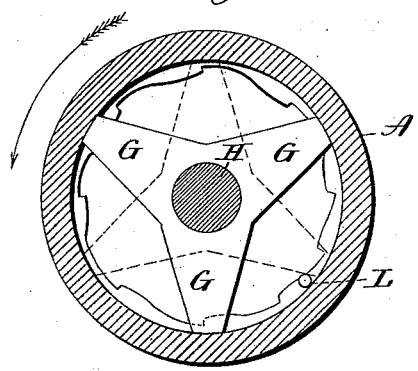
Figure 2:
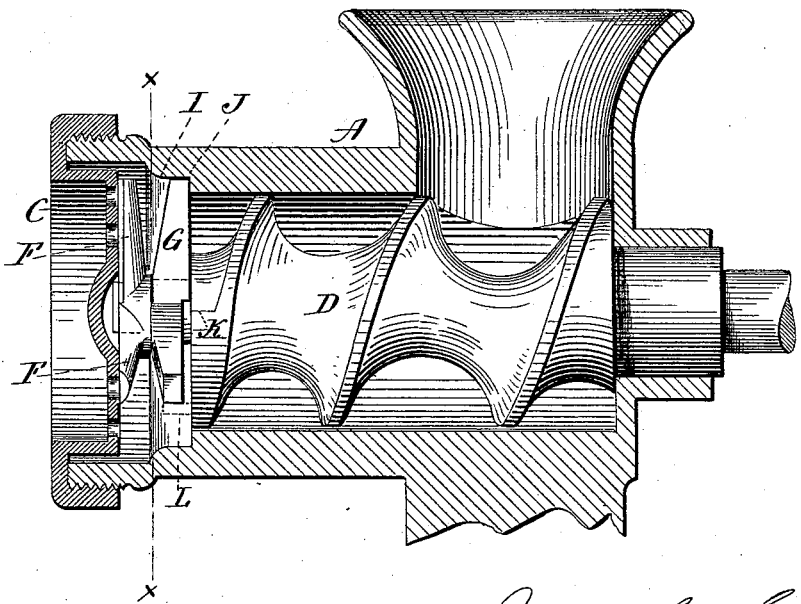

Figure 1, a side view of the cutter complete; Fig. 2, a longitudinal central section showing the screw and cutters in side view; Fig. 3, a transverse section cutting on line $x\ x$ of Fig. 2, looking inward.

This invention relates to an improvement in that class of meat-cutters which consists of a tubular shell or case having a hopper at one end to receive the meat and a perforated plate at the opposite end, through which the meat is discharged, and in which a forcing-screw is longitudinally arranged within the case, the screw carrying a cutter at its end adjacent to the perforated plate and so as to work inside of that plate to sever the meat which may be forced into the perforations of the plate and in which a stationary cutter is arranged in rear of the said plate-cutter, and against which a corresponding cutter on the screw will operate to preliminarily cut the meat before it reaches the perforated plate for the operation of the plate-cutter. The stationary cutter usually consists of two or more arms, each of which forms a cutter to act in connection with the cutter on the end of the forcing-screw.

In operation it frequently occurs that the meat will clog at the preliminary or stationary cutters, or between the preliminary or stationary cutters and the cutters of the perforated plate, so that it is necessary to open the machine to clear the clogging.

The object of my invention is to provide a means for relieving such clogging without opening the case or in any way disarranging the mechanism of the machine; and it consists in arranging the operatively stationary cutters so that while stationary in actual operation they may receive a limited rotation in the reverse direction and so that when clogging occurs the reversal of the screw will impart a partial rotation to the said stationary cutters, thereby changing their position with relation to the screw and so that the clogging will be relieved, and as more fully hereinafter described.

A represents the case, provided with a hopper B at one end, and at the other end a perforated plate C is removably applied, as usual in this class of meat-cutters. Within the case a longitudinal feeding-screw D is arranged, adapted for the application of power thereto at one end by means of a crank E or otherwise. The screw or arbor carries at its end next the perforated plate radial cutters F, more or less in number, which work against the inner surface of the perforated plate as the screw is rotated, in the usual manner for this class of cutters. The blade for the screw stops short of the cutters F, and between the cutters F F and the end of the blade of the screw stationary cutters G are arranged. These cutters, as here represented, are three in number, radiating from a central hub, the hub having an opening through it, through which a projection H on the end of the screw extends to carry the plate-cutters F. The length of the cutters G is somewhat greater than the internal diameter of the shell, and in the shell an annular recess I is made, so as to form a shoulder J, against which the inner surface of the cutters G may rest. The blade of the feeding-screw is constructed at its end next the stationary cutters G with a cutter K, which is adapted to work against the inner surface of the cutters G, and so that the meat which passes over the cutters G as the screw revolves will be operated upon by the cutter K, in connection with the cutters G, so as to sever the meat projecting beyond the cutter K of the screw, and thus produce a preliminary cut of the meat before it shall reach the perforated plate.

To hold the cutters G stationary, and so as to prevent their revolution under the rotation of the cutter, a stop L is formed in the recess, in which the cutters G stand. As here represented, this stop is produced by the introduction of a pin; but it may be otherwise produced. This stop holds the cutters G to prevent their rotation under the action of the screw, so that they are stationary while the screw is revolving in the cutting direction, that cutting direction being indicated by the arrow in Fig. 3. So long as the screw revolves in the cutting direction the cutters G remain stationary and operate in connection with the cutter of the screw the same as if they were permanently stationary in the case; but upon a reverse or backward rotation of the screw the mass of meat which is in contact with the cutters G will so engage those cutters that the reverse action of the screw and of the meat which it carries will cause a corresponding reverse rotation of the cutters G until the cutter upon the opposite side of the stop L will be brought into engagement with that stop, as indicated in broken lines, Fig. 3. There the cutters will again rest stationary so long as the reverse rotation of the screw continues. This reverse rotation of the cutters and bringing them to a stand or stationary position different from that which they occupy when working disarranges the mass of meat in connection therewith, and so that any clogging which may be produced either between the feed-screw and the cutters G or between the cutters G and the plate-cutters will be easily broken, and then the screw turned in the advanced direction, will bring the cutters G back to their normal position against the stop L. Thus by a simple reversal in the rotation of the screw the difficulty of clogging heretofore experienced in cutting meat is easily avoided and without opening the case or in any way disturbing the mechanism of the machine.

I claim—

In a meat-cutter of the class described, the combination of the feed-screw and the normally stationary or preliminary cutters, the said normally stationary or preliminary cutters being arranged in the case so as to permit a limited rotation thereof, and a stop in the case, against which the said cutters are brought to arrest their rotation and hold them in their normal working condition or permit their partial rotation by a reverse action of the screw, substantially as described.

In testimony whereof I have signed this specification in the presence of two subscribing witnesses.

JOHN H. SHAW.

Witnesses:
E. E. HOBB,
F. S. HAMLIN.